United States Patent
Amaku et al.

(10) Patent No.: US 7,398,282 B2
(45) Date of Patent: Jul. 8, 2008

(54) SYSTEM FOR RECORDING PROCESS INFORMATION OF A PLURALITY OF SYSTEMS

(75) Inventors: Hideyuki Amaku, Kobe (JP); Takahiko Kawashima, Kawasaki (JP); Isamu Kawamura, Kawasaki (JP); Nobuya Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 09/772,918

(22) Filed: Jan. 31, 2001

(65) Prior Publication Data
US 2003/0014427 A1 Jan. 16, 2003

(30) Foreign Application Priority Data
Jun. 16, 2000 (JP) ............................. 2000-181687

(51) Int. Cl.
*G06F 7/00* (2006.01)
*G06F 17/00* (2006.01)
*G06F 12/00* (2006.01)
*G06F 17/30* (2006.01)

(52) U.S. Cl. ....................................... 707/200; 707/100
(58) Field of Classification Search ................ 707/102, 707/200, 203, 202, 224, 10, 205; 709/202, 709/224, 206, 105, 216; 705/7; 711/112, 711/152, 117; 718/105; 714/4, 15
See application file for complete search history.

(56) References Cited

U.S. PATENT DOCUMENTS

| | | | | |
|---|---|---|---|---|
| 5,828,821 A * | 10/1998 | Hoshina et al. | ............... | 714/15 |
| 5,857,077 A * | 1/1999 | Nakagaki et al. | ............ | 709/238 |
| 5,987,571 A * | 11/1999 | Shibata et al. | .............. | 711/141 |
| 6,026,365 A * | 2/2000 | Hayashi | ......................... | 705/9 |
| 6,078,944 A * | 6/2000 | Enko et al. | ................... | 718/105 |
| 6,098,047 A * | 8/2000 | Oku et al. | ...................... | 705/7 |
| 6,131,114 A * | 10/2000 | Guezou et al. | .............. | 709/216 |
| 6,219,672 B1 * | 4/2001 | Hirayama et al. | ........... | 707/102 |
| 6,298,355 B1 * | 10/2001 | Tanaka et al. | ............... | 707/200 |
| 6,339,774 B1 * | 1/2002 | Nakayama et al. | ............ | 707/10 |
| 6,341,287 B1 * | 1/2002 | Sziklai et al. | ............... | 707/102 |
| 6,587,861 B2 * | 7/2003 | Wakai et al. | ................. | 715/500 |

(Continued)

FOREIGN PATENT DOCUMENTS

JP 09-050406 2/1997

(Continued)

OTHER PUBLICATIONS

Anand Sivasubramaniam (1997), reducing the communication overhead of dynamic applications on shared memory multiprocessors, pp. 194-203.*

(Continued)

*Primary Examiner*—Don Wong
*Assistant Examiner*—Merilyn P Nguyen
(74) *Attorney, Agent, or Firm*—Staas & Halsey LLP

(57) ABSTRACT

Process information for indicating the content of a process in each system can be recorded in a storage medium that is shared by a plurality of systems in an electronic data interchange process in a format such that the process histories of the systems can be tracked. The process histories between the systems can be tracked by searching for the recorded information.

6 Claims, 13 Drawing Sheets

U.S. PATENT DOCUMENTS 6,889,293 B1 * 5/2005 Kaxiras et al. .............. 711/147

FOREIGN PATENT DOCUMENTS

| JP | 09-054735 | 2/1997 |
| JP | 09-062627 | 3/1997 |
| JP | 10-063747 | 3/1998 |
| JP | 2000-010815 | 1/2000 |
| JP | 2000-010939 | 1/2000 |

OTHER PUBLICATIONS

Japanese Office Action w/ English translation issued Feb. 20, 2007 in corresponding Japanese Patent Application No. 2001-170448.

* cited by examiner

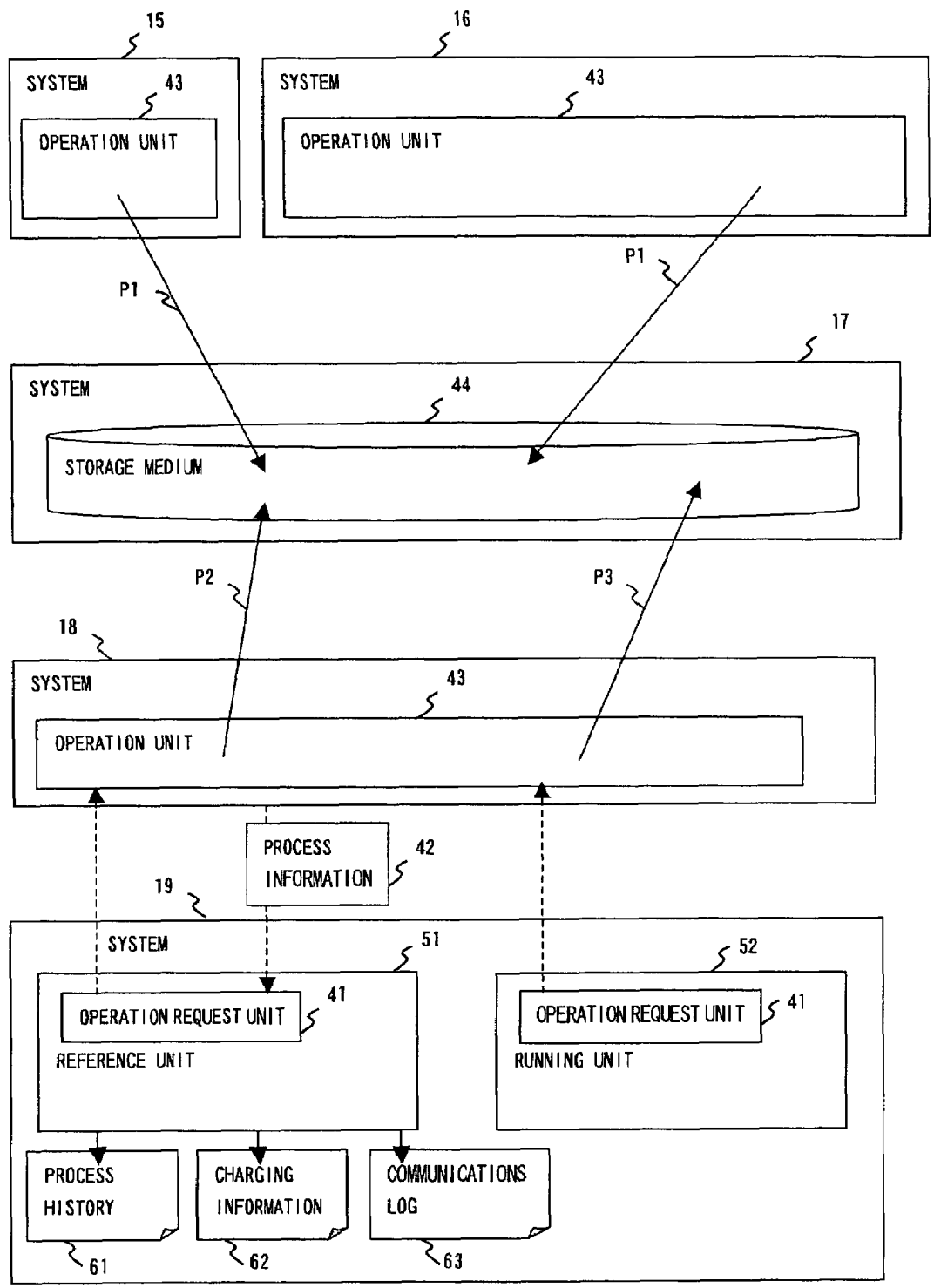
F I G. 3

SYSTEM C

OPERATION UNIT ~43

SYSTEM D ~44

STORAGE MEDIUM

| INFOR-MATION | CONTENT OF INFORMATION | NAME OF FUNCTION | NAME OF SYSTEM | SID | START TIME | END TIME | IDID | ODID |
|---|---|---|---|---|---|---|---|---|
| I 1 | BASIC PROCESS INFORMATION | CONVERSION T1 | SYSTEM A | S001.1 | 12:00... | 12:01.. | — | S001.1 |
| I 2 | | CONVERSION T2 | SYSTEM A | S001.2 | 12:00... | 12:01.. | — | S001.2 |
| I 3 | | TRANSFER | SYSTEM A | M001 | 12:10... | 12:11.. | G001 | G001/M001 |
| I 4 | | COLLECTION MONITORING | SYSTEM B | R001 | 12:20... | 12:21.. | G001/M001 | G001/M001/R001 |
| I 5 | | DIVISION | SYSTEM B | A001.1 | 12:30... | 12:31.. | G001/M001/R001 | G001/M001/R001/A001.1 |
| I 6 | | DIVISION | SYSTEM B | A001.2 | 12:30... | 12:31.. | G001/M001/R001 | G001/M001/R001/A001.2 |

| INFOR-MATION | CONTENT OF INFORMATION | ODID | INFORMATION FOR SPECIFYING AN OUTPUT CONTENT |
|---|---|---|---|
| I 7 | INPUT/OUTPUT HISTORY INFORMATION | S001.1 | CONVERSION DATA D1-1 OF CONVERSION FILE F1 |
| I 8 | | S001.2 | CONVERSION DATA D1-2 OF CONVERSION FILE F1 |
| I 9 | | G001/M001 | EVENT E0 |
| I 10 | | G001/M001/R001 | COLLECTION DATA D2 OF COLLECTION FILE F2 |
| I 11 | | G001/M001/R001/A001.1 | DIVISION DATA D3 OF DIVISION FILE F3 |
| I 12 | | G001/M001/R001/A001.2 | DIVISION DATA D4 OF DIVISION FILE F4 |

| INFORMATION | CONTENT OF INFORMATION | GDID | GROUPED INPUT/OUTPUT IDENTIFIER |
|---|---|---|---|
| I 13 | INPUT GROUP INFORMATION | G001 | S001.1, S001.2 |

FIG. 7

| BASIC PROCESS FUNCTION | NAME OF FUNCTION | NAME OF SYSTEM | START TIME | END TIME |
|---|---|---|---|---|
| | TRANSFER | SYSTEM A | 12:01.30 | 12:01.32 |
| | COLLECTION | SYSTEM B | 14:10.15 | 14:11.01 |
| | TRANSFER | SYSTEM A | 14:21.30 | 14:21.42 |
| | COCCECTION | SYSTEM B | 16:15.15 | 16:15.14 |

F I G. 1 0

| CONTENT OF INFORMATION | ODID | INFORMATION FOR SPECIFYING AN OUTPUT CONTENT |
|---|---|---|
| INPUT/OUTPUT HISTORY INFORMAITON | S001/R001 | COLLECTION DATA D2 OF COLLECTION FILE F2 |

| CONTENT OF INFORMATION | NAME OF FUNCTION | START TIME | END TIME | IDID | ODID |
|---|---|---|---|---|---|
| BASIC PROCESS INFORMATION | CONVERSION T1 | 12:00... | 12:01.. | -- | S001 |
| | COLLECTION | 12:10... | 12:11.. | S001 | S001/R001 |
| | DIVISION | 12:20... | 12:21.. | S001/R001 | S001/R001/A001.1 |
| | DIVISION | 12:20... | 12:21.. | S001/R001 | S001/R001/A001.2 |
| | CONVERSION T2 | 12:23... | 12:24.. | S001/R001/A001.1 | S001/R001/A001.1/T001.1 |
| | CONVERSION T2 | 12:23... | 12:24.. | S001/R001/A001.2 | S001/R001/A001.2/T001.2 |

91

F I G. 11

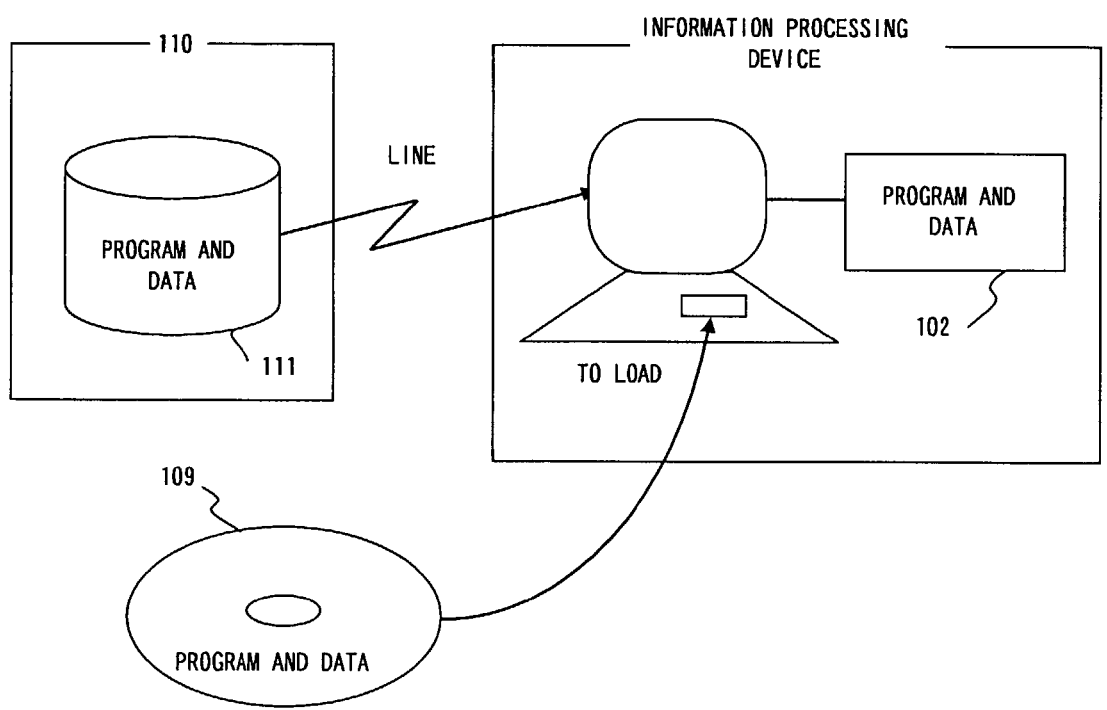
F I G. 1 3

SYSTEM FOR RECORDING PROCESS INFORMATION OF A PLURALITY OF SYSTEMS

BACKGROUND OF THE INVENTION

1. Field of the Invention

The present invention relates to a system for recording information about the process history of each system and implementing the reference of a transaction state in a system and between systems, and the collection of charging information and communications logs, etc., based on recorded information in a data processing system composed of a plurality of systems like an electronic data interchange (EDI) system.

2. Description of the Related Art

Recently an electronic data interchange system for exchanging data for business transactions between the systems of different companies has been spread. In such a system, data, such as order slips, order acceptance slips, etc., are transmitted/received between the computers of the different companies via a communications network. In a conventional electronic data interchange system, a method for integrating the history information of a process into a data format in order to transfer a process history between processes or systems, is adopted. According to this method, when each of a plurality of sequential processes is completed, it records a new history in the formats of both input data and output data. In this way, each process history can be transferred to a subsequent process and a process for tracking a history, etc., becomes available.

In a specific communications protocol, etc., history information is managed separately from actual data by integrating the history information into a protocol message. According to this method, a process history can be recorded and transferred to a subsequent process without affecting the format of data.

However, of the conventional process history recording methods described above, a method for integrating history information into a format has the following problems.

(1) Since history information must be stored in data, a format to be used is restricted and a standard format stipulated for each industry cannot be used.
(2) Since history information must be stored in data, a process history stored in data to be tracked must be confirmed when a process history is tracked. In this case, if data distributed among a plurality of systems are tracked, each system must be accessed and a process history stored in data must be confirmed. Therefore, a communications process becomes complex and it cannot necessarily be said to be a general method.
(3) Since history information must be stored in data, this method cannot be applied to a process without data.

The method for integrating history information into a protocol message has the problem that the method cannot be applied to a communication protocol into which history information cannot be integrated.

SUMMARY OF THE INVENTION

It is an object of the present invention to provide a more general recording system used to implement the recording and utilization of process histories in a data processing system composed of a plurality of systems like an electronic data interchange system.

The recording system in the first aspect of the present invention comprises a generation device and a recording device. The generation device generates the process information of a specific system that represents the content of each process of the system. The recording device records the process information of the specific process system in a storage medium that is shared by a plurality of systems, including the system and that stores a plurality of pieces of process information of those systems, in the format such that the process histories of those systems can be tracked.

The retrieval system in the second aspect of the present invention comprises a retrieval device and a generation device. The retrieval device is a storage medium shared by a plurality of systems and retrieves data from the storage medium that stores a plurality of pieces of process information indicating the content of each process of those systems, in the format such that the process histories of the systems can be tracked. The generation device generates the process history based on the information obtained from the storage medium by the retrieval.

The retrieval system in the third aspect of the present invention comprises the retrieval device in the second aspect and a process device. The process device processes information using the information obtained from the storage medium by the retrieval.

BRIEF DESCRIPTIONS OF THE DRAWINGS

FIG. 3 shows the configuration of an electronic data interchange system (No. 2).

FIG. 7 shows a second process information (No. 2).

FIG. 10 shows an example of a communications log.

FIG. 11 shows an example of charging information.

FIG. 13 shows examples of storage media.

DESCRIPTION OF THE PREFERRED EMBODIMENTS

The preferred embodiments of the present invention are described in detail below with reference to the drawings.

Figure 1:
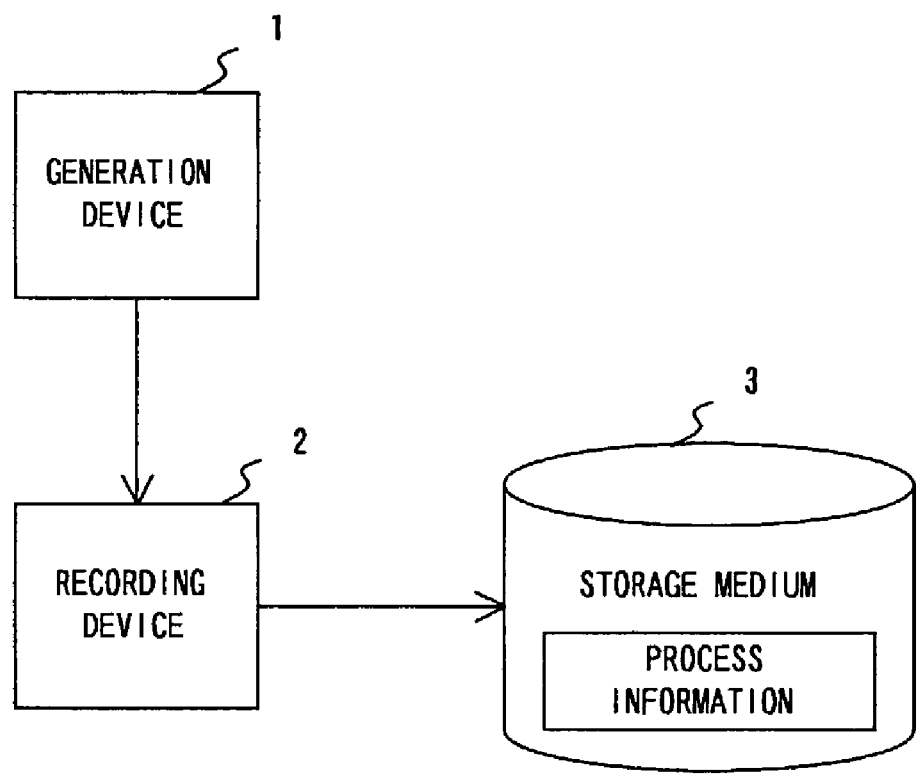
FIG. 1 shows the basic configuration of the recording system of the present invention.

FIG. 1 shows the basic configuration of the recording system of the present invention.

The recording system in the first aspect of the present invention comprises a generation device 1 and a recording device 2. The generation device 1 generates process information that belongs to a specific system and that indicates the content of a process of the system. The recording device 2 records the process information of the specific system in a storage medium 3 that is shared by a plurality of systems, including the system and that stores a plurality of pieces of process information of those systems, in the format such that the process histories of those systems can be tracked.

The generation device 1 generates the process information of a specific system, for example, in a format shared by the plurality of systems, transfers the process information to the recording device 2 and requests the recording device 2 to write the process information in the storage medium 3. The storage medium 3 corresponds to, for example, a storage device that can be commonly accessed by the plurality of systems.

On receipt of a request from the generation device 1, the recording device 2 records the process information of a specific system in the storage medium 3. If the recording medium 3 belongs to the same system as the recording device 2, the recording device 2 writes the process information in the storage medium 3. If the storage medium 3 belongs to another system, the recording device 2 transfers the process information to the other system and requests the system to write the process information. In this process, the process information can be recorded in the storage medium 3 in a format such that the process histories of the plurality of systems can be tracked.

According to such a recording system, the process histories of a plurality of systems can be tracked by referring to the process information of a storage medium 3 shared by the plurality of systems. Therefore, if the process histories of a plurality of systems are recorded and used, a general process can be performed regardless of the types of a data format, a communication protocol, a process, etc., regardless of the types of a data format, a communication protocol, a process, etc.

The generation device 1 generates process information, for example, by relating service identification information, input identification information related to an input content, output identification information related to an output content and the content of information to each other for each process. In this case, the input identification information is generated from the output information related to the output content of a preceding process, and the output identification information is generated by combining the input identification information with service identification information.

For example, the generation device 1 and recording device 2 and storage medium 3 shown in FIG. 1 correspond to each exchange process unit shown in FIG. 2, an operation unit 43 shown in FIG. 2 and storage medium 44 shown in FIG. 3, which is described later. The storage medium 3 shown in FIG. 1 corresponds to a storage medium 44 shown in FIG. 3, which is also described later. The service identification information, input identification information and output identification information correspond to, for example, a service identifier, an input/output identifier related to an input content, an input/output identifier related to an output content, respectively. Furthermore, in another aspect of the present invention, the following retrieval system can be implemented.

The retrieval system in the second aspect of the present invention comprises a retrieval device and a generation device. The retrieval device is a storage medium shared by a plurality of systems and retrieves data from the storage medium that stores the process information indicating the content of each process of those systems, in the format such that the process histories of the systems can be tracked. The generation device generates the process history based on the information obtained from the storage medium by the retrieval.

If the storage medium belongs to the same system as the retrieval device, the retrieval device retrieves data from the storage medium. If the storage medium belongs to another system, the retrieval device transfers a retrieval request to the other system and receives a retrieval result from the system. In this process, a part of the process information recorded in the storage medium is obtained. The generation device generates a process history by properly arranging the obtained process information.

According to such a retrieval system, the process histories of a plurality of systems can be generated regardless of the types of a data format, a communications protocol, a process, etc., by retrieving the process information from a storage medium shared by the plurality of systems.

The retrieval system in the third aspect of the present invention comprises the retrieval device in the second aspect and a process device. The process device processes information using the information obtained from the storage medium by the retrieval.

According to such a retrieval system, an information process can be performed based on the process histories of a plurality of systems by retrieving the process information from a storage medium shared by the plurality of systems. In this way, the process histories of a plurality of systems can be used regardless of the types of a data format, a communication protocol, a process, etc.

For example, the retrieval device corresponds to an operation unit 43 shown in FIG. 3, and both the generation device and process device correspond to a reference unit 51 shown in FIG. 3.

In this preferred embodiment, in an electronic data interchange process, including the collection/transfer of data, the process of data (format conversion, compression/enlargement, division, etc.), the distribution of data, etc., process information for indicating the content of each process between systems and in a system is stored in a storage medium shared by a plurality of systems. For the information element, the date and time of a process, the name of a process (name of function), the name of system, an input/output content (event, message, the name of a file, the name of an area, the information of data, etc.) are used.

In this way, the histories of the preceding and following processes of each process can be tracked using each element of process information recorded in a storage medium as a key, and it becomes unnecessary to integrate history information into a data format or protocol electronic message conventionally.

Figure 2:
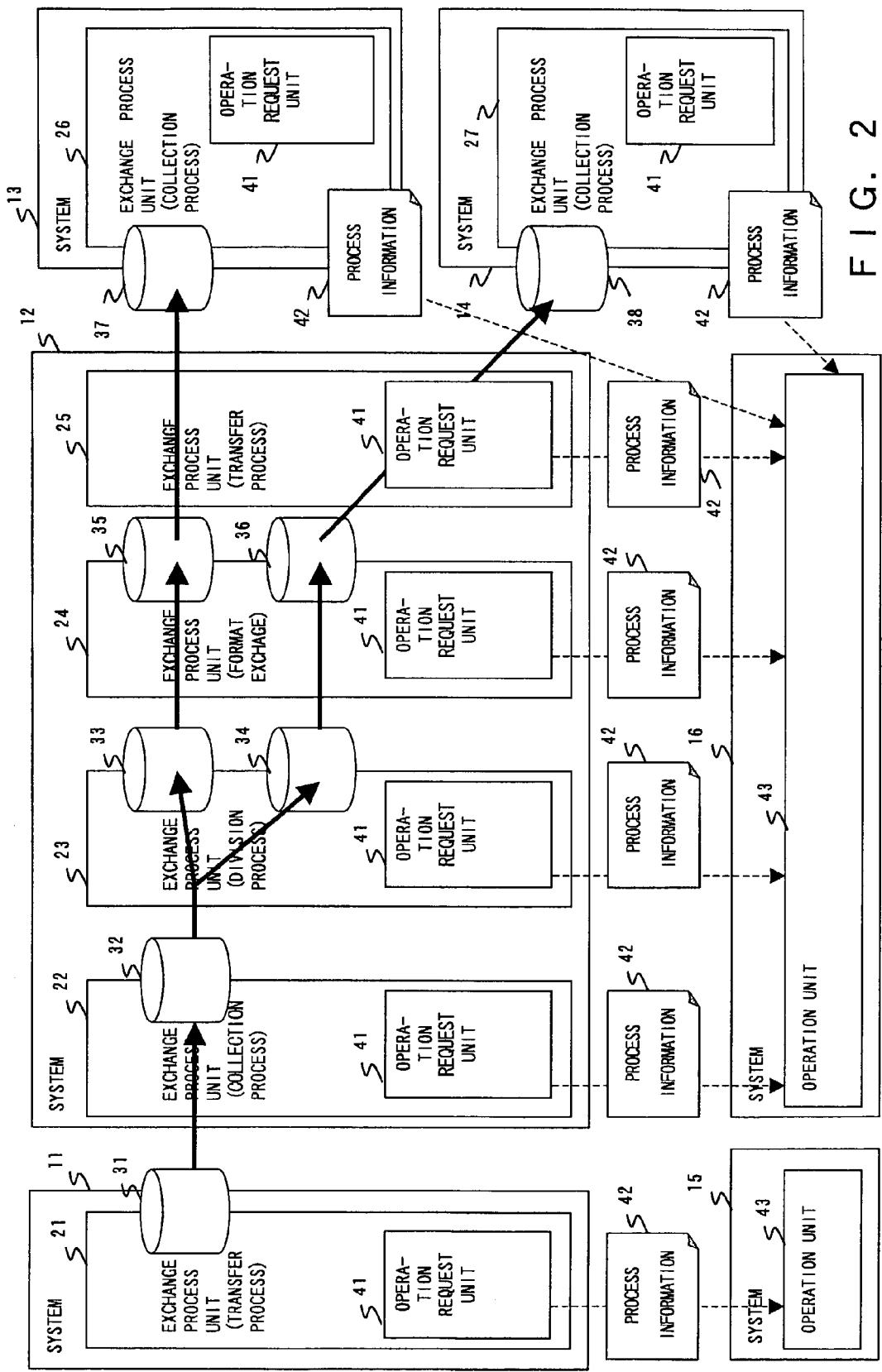
FIG. 2 shows the configuration of an electronic data interchange system (No. 1).

FIGS. 2 and 3 show the configuration of an electronic data interchange system using such process information. This electronic data interchange system is composed of systems 11 through 19. These systems are connected to each other via a communications network, and each system includes a computer for processing data.

The system 11 comprises an exchange process unit 21 for transferring data. The system 12 comprises an exchange process unit 22 for collecting data, an exchange process unit 23 for distributing data, an exchange process unit 24 for converting a data format and an exchange process unit 25 for transferring data. The systems 13 and 14 comprise exchange process units 26 and 27 for collecting data, respectively.

The exchange process unit 21 transfers data stored in a file 31 to the system 12, and the exchange process unit 22 stores the received data in a file 32. The exchange process unit 23 distributes the data of the file 32 among files 33 and 34. The exchange process unit 24 converts the data of the files 33 and 34 and stores in files 35 and 36, respectively, and the exchange process unit 25 transfers the data of the files 35 and 36 to the systems 13 and 14, respectively. The exchange process units 26 and 27 store the received data in files 37 and 38, respectively.

In this way, each exchange process unit performs an individual service process in the electronic data interchange system. Each of these exchange process units includes an operation request unit 41. Each operation request unit 41 outputs process information 42 corresponding to a process content.

Each of the systems 15, 16 and 18 includes an operation unit 43. The operation unit 43 records process information 42 in the storage medium 44 of the system 17 or retrieves/deletes process information 42 from the storage medium 44. The operation unit 43 is provided with an interface for accessing the storage medium 44 in the same or another system in answer to a request from the operation request unit 41 in the same system or another system connected via one of a variety of networks. In this way, process information 42 can be recorded, searched for or deleted in a network.

The system 19 comprises a reference unit 51 and a running unit 52. The reference unit 51 includes an operation request unit 41, references the process information 42 of a storage medium 44 and outputs a variety of information, such as a process history 61, charging information 62, a communications log 63, etc. The running unit 52 includes an operation request unit 41 and, for example, deletes process information 42 from the storage medium 44, etc.

In this electronic data interchange system, the operation request unit 41 has a function to request the operation unit 43 to record, search for, delete, etc., process information 42. For example, the operation request unit 41 of each exchange process unit transfers process information 42 to the operation unit 43 of the system 15 or 16 and requests the operation unit 43 to record the process (P1). The operation unit 43 records the received process information 42 in the storage medium 44.

The operation request unit 41 of the reference unit 51 requests the operation unit 43 of the system 18 to search for process information 42 (P2), and the operation unit 43 returns the process information 42 obtained from the storage medium 44 as a retrieval result. Then, the reference unit 51 generates a variety of information based on the retrieval result. The operation request unit 41 of the running unit 52 requests the operation unit 43 of the system 18 to delete the process information 42 (P3), and the operation unit 43 deletes the designated process information 42 from the storage medium 44.

According to such an electronic data interchange system, process information 42 generated by the exchange process unit of each system is managed by a shared storage medium 44, and a plurality of pieces of process information 42 from all the systems in the electronic data interchange system can be recorded, searched for or deleted. For example, the process information 42 generated in each system is recorded in the storage medium 44 and the information can be referenced by another system.

In this way, history information conventionally stored in a data format, a communications protocol, etc. can be transferred via a shared storage medium 44 and is not restricted by the format or communications protocol, etc., of handled data. Since the storage medium 44 is shared, the process information 42 of the entire electronic data interchange system can be collectively managed.

Although in this example, the operation unit 43, storage medium 44, reference unit 51 and running unit 52 are distributed and installed among a plurality of systems, a part or all of these components can also be installed in one system. Furthermore, a part or all of these components can also be installed in a system with an exchange process unit.

The generation method of process information 42 is as follows. The exchange process unit generates a global identifier (hereinafter called as a "service identifier") for each request in an individual process. The exchange process unit retrieves and obtains an identifier related to the input content of the current process (hereinafter called an "input/output identifier") from the storage medium 44 via both the operation request unit 41 and operation unit 43 (hereinafter simply described to "retrieve and obtain the storage medium"). The detailed acquisition method of the input/output identifier is described later.

If there are a plurality of inputs, the input/output identifiers individually obtained are grouped using another global identifier (hereinafter called an "input group identifier"). Then, the relationship between the input/output identifier and input group identifier is recorded in the storage medium 44 as a part of process information 42 (hereinafter called "input group information") via both the operation request unit 41 and operation unit 43 (hereinafter simply described to "be recorded in a storage medium").

The exchange process unit also generates a new input/output identifier by combining an input/output identifier or input group identifier with a service identifier. Then, the exchange process unit relates the generated input/output identifier to information for specifying the output content of a process (event, message, the name of a file, the date and time of storage, the name of a function, the name of an area, the information of data, etc.) and records the relationship in the storage medium 44 as a part of process information 42 (hereinafter called "input/output history information"). The name of a function indicates, for example, the name of a service.

If there are a plurality of output contents of a process, similarly the exchange process unit generates the same number of input/output identifiers as that of the output contents and sequentially numbers the generated input/output identifiers. Then, the exchange process unit relates each input/output identifier to the information for specifying each output content and records the relationship in the storage medium 44 as input/output history information. The input/output identifier included in this input/output history information is handled as an input/output identifier related to an output content.

Furthermore, the exchange process unit relates a service identifier to the detailed content of a process (start time, end time, the name of a system, the name of a function, the name of a user, input/output identifier related to an input content, etc.) and generates the same number of relationship as that of output data. Then, the exchange process unit records the relationship as a part of process information (hereinafter called "basic process information") in the storage medium.

The input/output history information recorded in the storage medium 44 in the preceding process is used to obtain an input/output identifier related to an input content in the current process. In this case, the exchange process unit searches for the input/output history information using the input content of the current process as a key and obtains an input/output identifier related to an output content corresponding to the content. Then, the exchange process unit uses the obtained input/output identifier as an input/output identifier related to the input content of the current process.

According to such process information 42, the input/output identifier of the current process always includes both the input/output identifier and the latest service identifier of the preceding process, and further the input/output identifier of the preceding process includes both the input/output identifier of a process before the preceding process and the service identifier of the preceding process. Since this relationship is repeated from the beginning a series of processes to the end, the input/output identifier indicates a process history covering the first process through the current process.

Since a method for storing all the pieces of process information 42 in the storage medium 44 and storing no information in the format of input/output data is adopted, it is not always necessary for the input/output of a process to accompany data. Therefore, this method is also applicable to a process without the input/output of data.

Next, specific examples of the processes of the electronic data interchange systems are described with reference to FIGS. 4 through 11.

Figure 4:
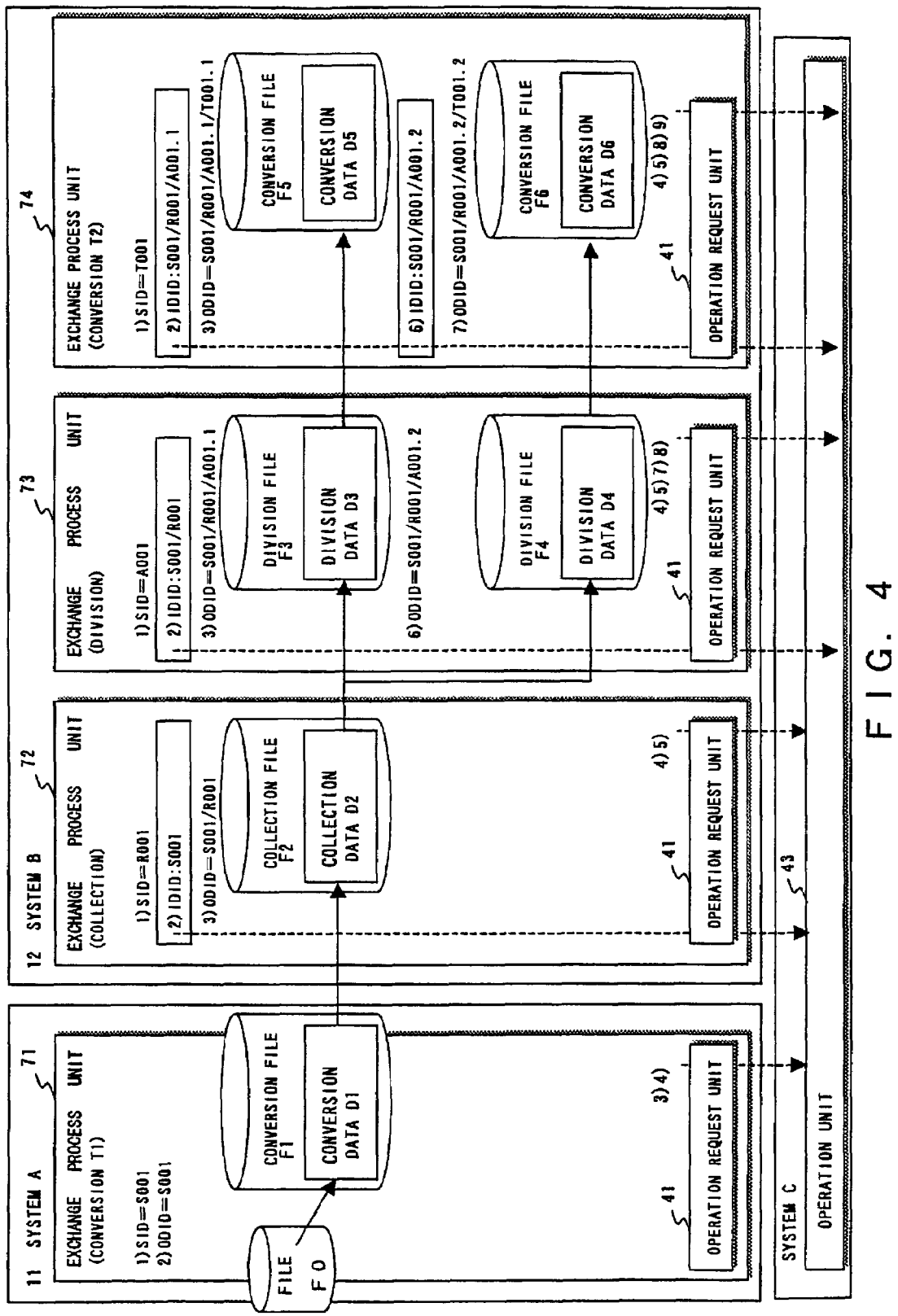
FIG. 4 shows a first process information (No. 1).
Figure 5:
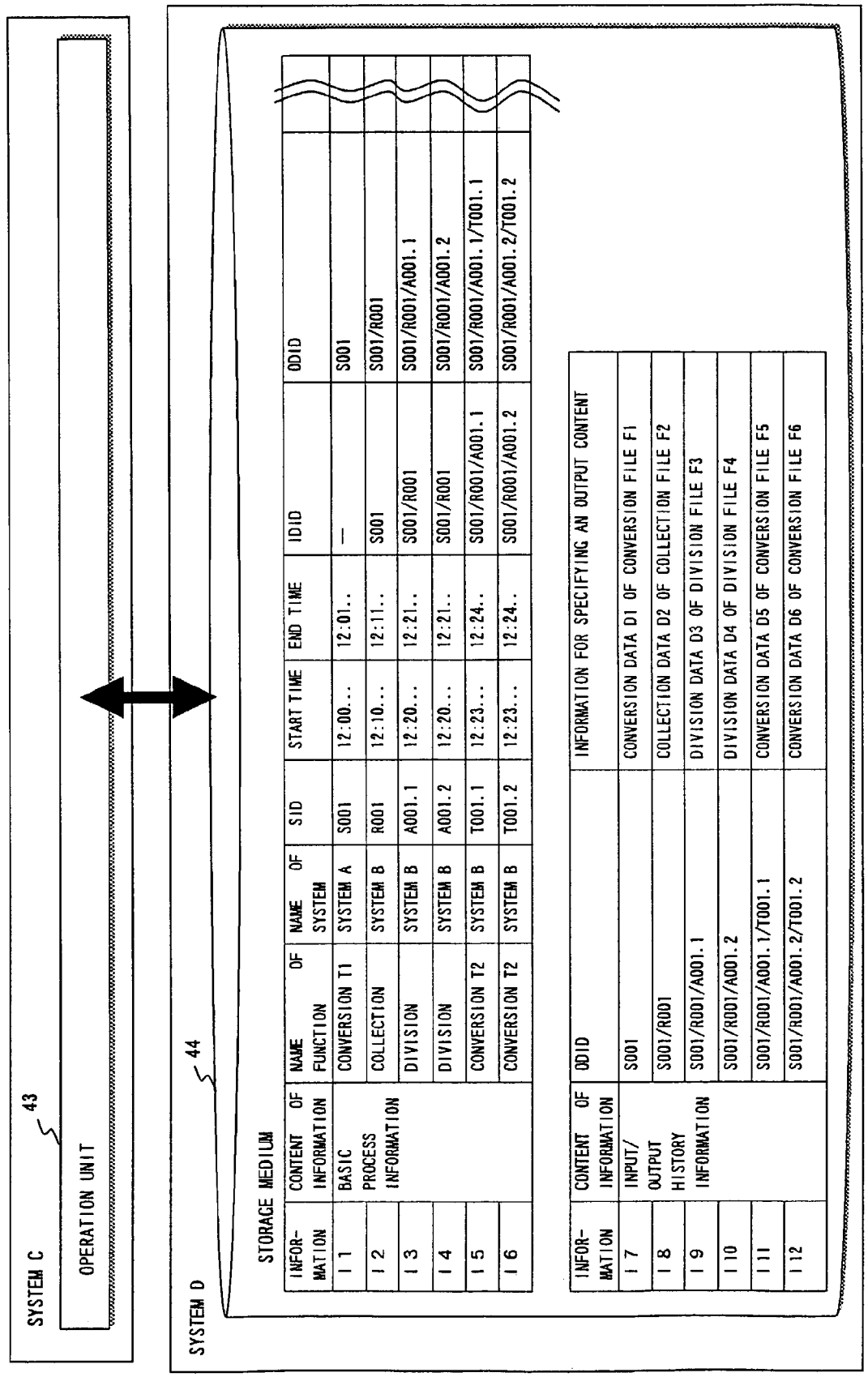
FIG. 5 shows a first process information (No. 2).

FIGS. 4 and 5 show an example of a process for generating and recording process information. First, the exchange process unit 71 of system A converts the data of file F0 by conversion process T1 and stores the obtained conversion data D1 in conversion file F1. Then, the exchange process unit 72 of system B collects conversion data D1 and stores the data in collection file F2 as collection data D2. Then, the exchange process unit 73 divides collection data D2 into division data D3 and D4 and separately stores the division data D3 and D4 in division files F3 and F4, respectively.

Then, the exchange process unit 74 converts division data D3 and D4 by conversion process T2 and stores the obtained conversion data D5 and D6 in conversion files F5 and F6, respectively.

In FIGS. 4 and 5, SID, IDID and ODID represent a service identifier, an input/output identifier related to an input content and an input/output identifier related to an output content, respectively. Of these, ODID is described according to the following rules and indicates the history of a process performed for corresponding output data. However, a serial number is attached if a plurality of output contents are generated by the separation and the division of data.

ODID: [IDID/SID(.serial No.)]

In each exchange process unit, process information is generated and recorded in the following procedure.

[Exchange Process Unit 71]
1) It generates S001 as an SID.
2) It generates S001 as an ODID.
3) It relates conversion the data D1 of conversion file F1 to ODID as an output content and generates input/output history information. Then, it records the information in the storage medium 44 of system D as process information I7 via both the operation request unit 41 and the operation unit 43 of system C.
4) It generates basic process information and records the information in the storage medium 44 as process information I1 via both the operation request unit 41 and operation unit 43.

[Exchange Process Unit 72]
1) It generates R001 as an SID.
2) It receives the conversion data D1 of conversion file F1 as an input content and retrieves data from the storage medium 44 via both the operation request unit 41 and operation unit 43 using the information as a key. Then, it obtains the S001 of process information I7 as an IDID.
3) It generates S001/R001 as an ODID.
4) It generates input/output history information by relating the collection data D2 of collection file F2 to ODID as an output content and records the information in the storage medium 44 as process information I8.
5) It generates basic process information and records the information in the storage medium 44 as process information I2.

[Exchange Process Unit 73]
1) It generates A001 as an SID.
2) It receives the collection data D2 of collection file F2 as an input content and retrieves data from the storage medium 44 using the information as a key. Then, it obtains the S001/R001 of process information I8 as an IDID.
3) It generates S001/R001/A001.1 as a first ODID.
4) It generates input/output history information by relating the division data D3 of division file F3 to the first ODID as an output content and records the information in the storage medium 44 as process information I9.
5) It generates basic process information and records the information in the storage medium 44 as process information I3.
6) It generates S001/R001/A001.2 as a second ODID.
7) It generates input/output history information by relating the division data D4 of division file F4 to the second ODID as an output content and records the information in the storage medium 44 as process information I10.
8) It generates basic process information and records the information in the storage medium 44 as process information I4.

[Exchange Process Unit 74]
1) It generates T001 as an SID.
2) It receives the division data D3 of division file F3 as an input content and retrieves data from the storage medium 44 using the information as a key. Then, it obtains S001/R001/A001.1 of process information I9 as an IDID.
3) It generates S001/R001/A001.1/T001.1 as a first ODID.
4) It generates input/output history information by relating the conversion data D5 of conversion file F5 to the first ODID as an output content and records the information in the storage medium 44 as process information I11.
5) It generates basic process information and records the information in the storage medium 44 as process information I5.
6) It receives the division data D4 of division file F4 as an input content and retrieves data from the storage medium 44 using the information as a key. Then, it obtains S001/R001/A001.2 of process information I10 as an IDID.
7) It generates S001/R001/A001.2/T001.2 as a second ODID.
8) It generates input/output history information by relating the conversion data D6 of conversion file F6 to the second ODID as an output content and records the information in the storage medium 44 as process information I12.
9) It generates basic process information and records the information in the storage medium 44 as process information I6.

In the examples described above, each exchange process unit generates one or more pieces of output data from one piece of input data. However, there can also be a case where a plurality of pieces of data are inputted to an exchange process unit and a case where an exchange process unit generates no output data.

Figure 6:
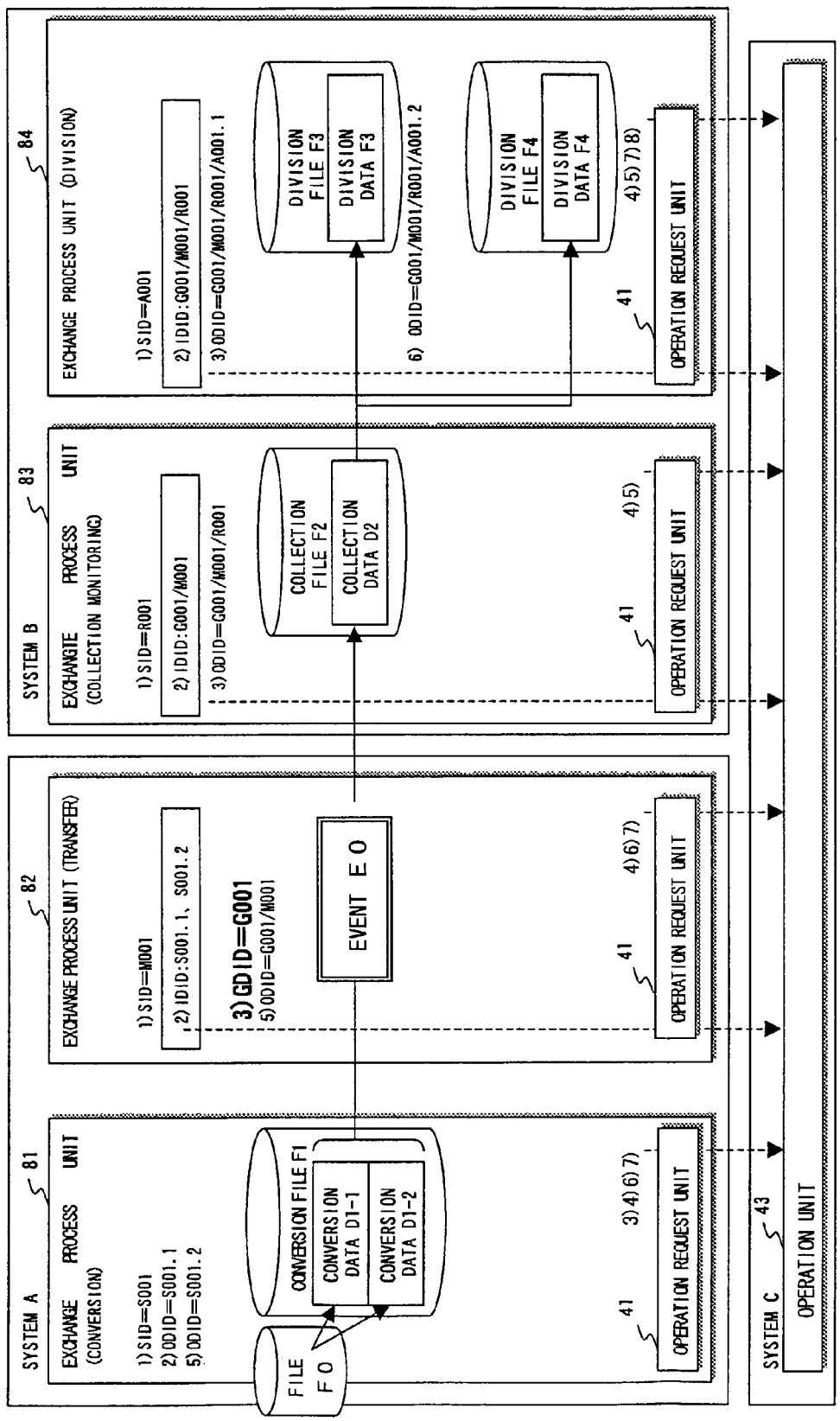
FIG. 6 shows a second process information (No. 1).

FIGS. 6 and 7 show an example of a process for generating and recording process information in such a case. First, the exchange process unit 81 of system A converts the data of file F0 and stores obtained conversion data D1-1 and D1-2 in file F1.

Then, if the exchange process unit 82 collectively transfers conversion data D1-1 and D1-2 to system B and completes the transfer process, the exchange process unit 82 notifies system B of the occurrence of event E0 by a message, etc. In this case, the transferred data is stored in collection file F2 as collection data D2 by the exchange process unit 83 of system B. Then, the exchange process unit 84 divides the collection data D2 into division data D3 and D4, and separately stores the data D3 and D4 in division files F3 and F4, respectively.

In this case, the exchange process unit 82 notifies the exchange process unit 83 of only event E0 and does not notify the unit 83 of the storage destination of the transferred data. The exchange process unit 83 handles as an output content the collection data D2 of collection file F2 transferred when event E0 is reported without being conscious that the data are transferred from the exchange process unit 82. Therefore, the process performed by the exchange process unit 82 corresponds to a process without output data.

In FIGS. 6 and 7, GDID represents an input group identifier for grouping a plurality of input/output identifiers. In each exchange process unit, process information is generated and recorded in the following procedure.

[Exchange Process Unit 81]
1) It generates S001 as an SID.
2) It generates S001.1 as a first ODID.
3) It relates the conversion data D1-1 of conversion file F1 to the first ODID as an output content and generates input/output history information. Then, it records the information in the storage medium 44 of system D as process information I7 via both the operation request unit 41 and the operation unit 43 of system C.
4) It generates basic process information and records the information in the storage medium 44 as process information I1 via both the operation request unit 41 and operation unit 43.
5) It generates S001.2 as a second ODID.
6) It generates input/output history information by relating the conversion data D1-2 of conversion file F1 to the second ODID as an output content and records the information in the storage medium 44 as process information I8.
7) It generates basic process information and records the information in the storage medium 44 as process information I2.

[Exchange Process Unit 82]
1) It generates M001 as an SID.
2) It receives the conversion data D1-1 and D1-2 of conversion file F1 as an input content and retrieves data from the storage medium 44 via both the operation request unit 41 and operation unit 43 using the information as a key. Then, it obtains both the S001.1 of process information I7 and the S001.2 of process information I8 as IDIDs.
3) It generates G001 as a GDID.
4) It groups these IDIDs by relating both S001.1 and S001.2 to GDID. Then, it generates the input group information of GDID and records the information in the storage medium 44 as process information I13 via both the operation request unit 41 and operation unit 43.
5) It generates G001/M001 as an ODID.
6) It generates input/output history information by relating event E0 to ODID as an output content and records the information in the storage medium 44 as process information I9.
7) It generates basic process information and records the information in the storage medium 44 as process information I3.

[Exchange Process Unit 83]
1) It generates R001 as an SID.
2) It receives event E0 as an input content and retrieves data from the storage medium 44 using the information as a key. Then, it obtains the G001/M001 of process information I9 as an IDID.
3) It generates G001/M001/R001 as an ODUD.
4) It generates input/output history information by relating the collection data D2 of collection file F2 to ODID as an output content and records the information in the storage medium 44 as process information I10.
5) It generates basic process information and records the information in the storage medium 44 as process information I4.

[Exchange Process Unit 84]
1) It generates A001 as an SID.
2) It receives the collection data D2 of collection file F2 as an input content and retrieves data from the storage medium 44 using the information as a key.
3) It generates G001/M001/R001/A001.1 as a first ODID.
4) It generates input/output history information by relating the division data D3 of division file F3 to the first ODID as an output content and records the information in the storage medium 44 as process information I11.
5) It generates basic process information and records the information in the storage medium 44 as process information I5.
6) It generates G001/M001/R001/A001.2 as a second ODID.
7) It generates input/output history information by relating the division data D4 of division file F4 to the second ODID as an output content and records the information in the storage medium 44 as process information I12.
8) It generates basic process information and records the information in storage medium 44 as process information I6.

The process information stored in the storage medium 44 in this way can be searched for using an element designated when the information is recorded as a key. In this example, the name of a function, the name of a system, SID, a start time, an end time, IDID and ODID are designated as the element of the basic process information. Furthermore, another element, such as the name of a user, etc., can also be designated.

As the element of the input/output history information, information for specifying both ODID and an output content is designated. As the information for specifying the output content, a message, the date and time of delivery, the name of a function, the name of an area, the information of data, etc., can be designated besides the name of a file and the name of an event. As the element of the input group information, an input/output identifier grouped with CDID is designated.

Therefore, information related to the identifier can be obtained by retrieving data from the storage medium 44 using one of SID, IDID, ODID and GDID as a key. Conversely, an identifier corresponding to the information can also be obtained by retrieving data from the storage medium 44 using information related to one of SID, IDID, ODID and GDID as a key.

Since the storage medium 44 is shared by all the systems in the electronic data interchange system, a plurality of pieces of process information recorded by each system can be collectively searched for. Therefore, there is no need to access a system where a process is performed at the time of retrieval.

A process history relating to the process information can be tracked by using an input/output identifier (IDID, ODID) in the process information obtained from the storage medium 44 by such a retrieval process.

In this case, first, recorded process information is searched for and the input/output identifier of a process to be tracked is specified. Then, the specified input/output identifier is analyzed, both input/output history information and input group information are searched for using the constituent element (SID, input/output identifier of the preceding process) and both the function name of a service corresponding to an SID and an input/output content corresponding to the input/output identifier of the preceding process are obtained. Furthermore, process history information can be obtained by repeating the same analysis for the input/output identifier of the preceding process.

Figure 8:
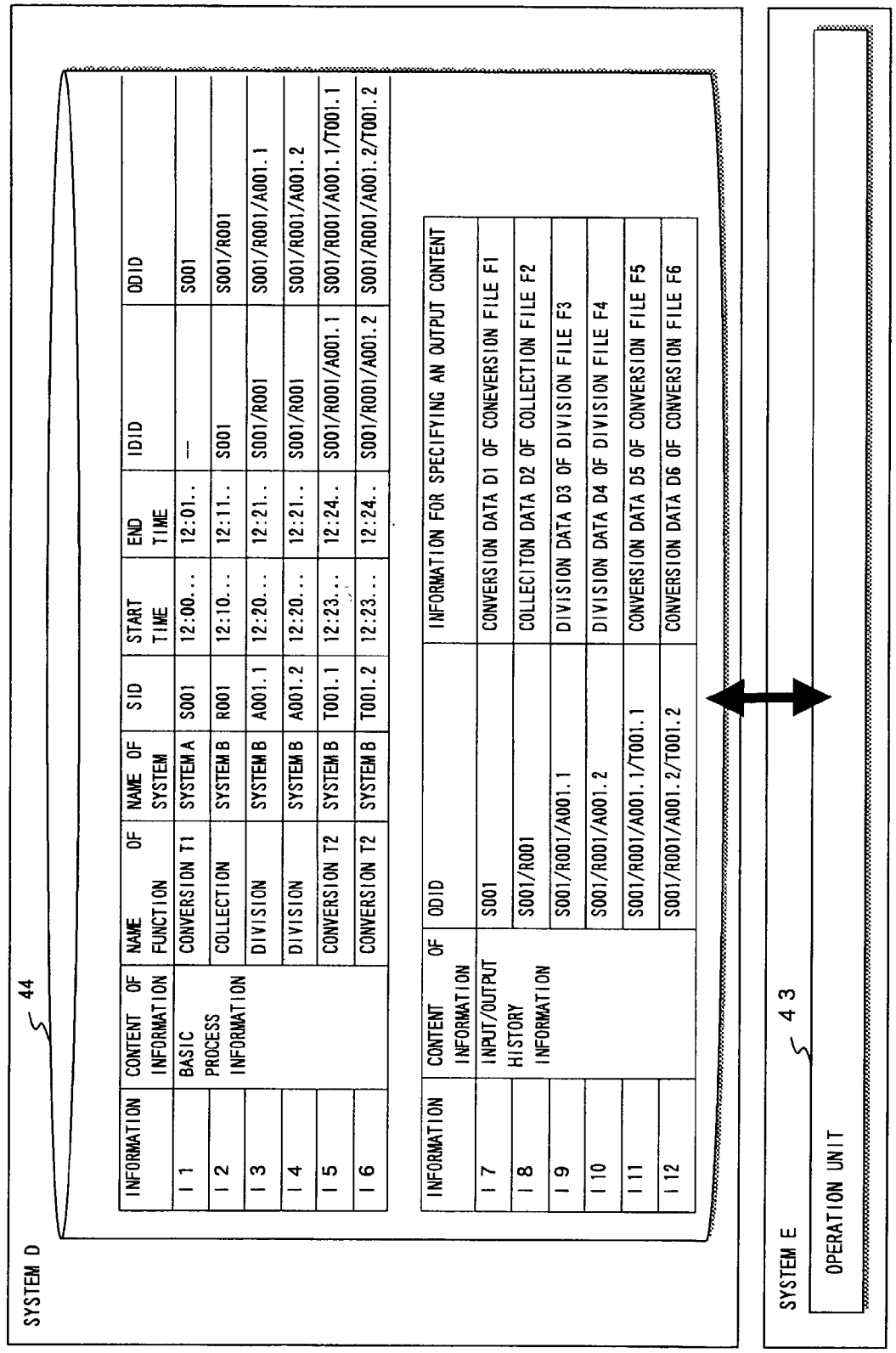
FIG. 8 shows the tracking process of a process history (No. 1).
Figure 9:
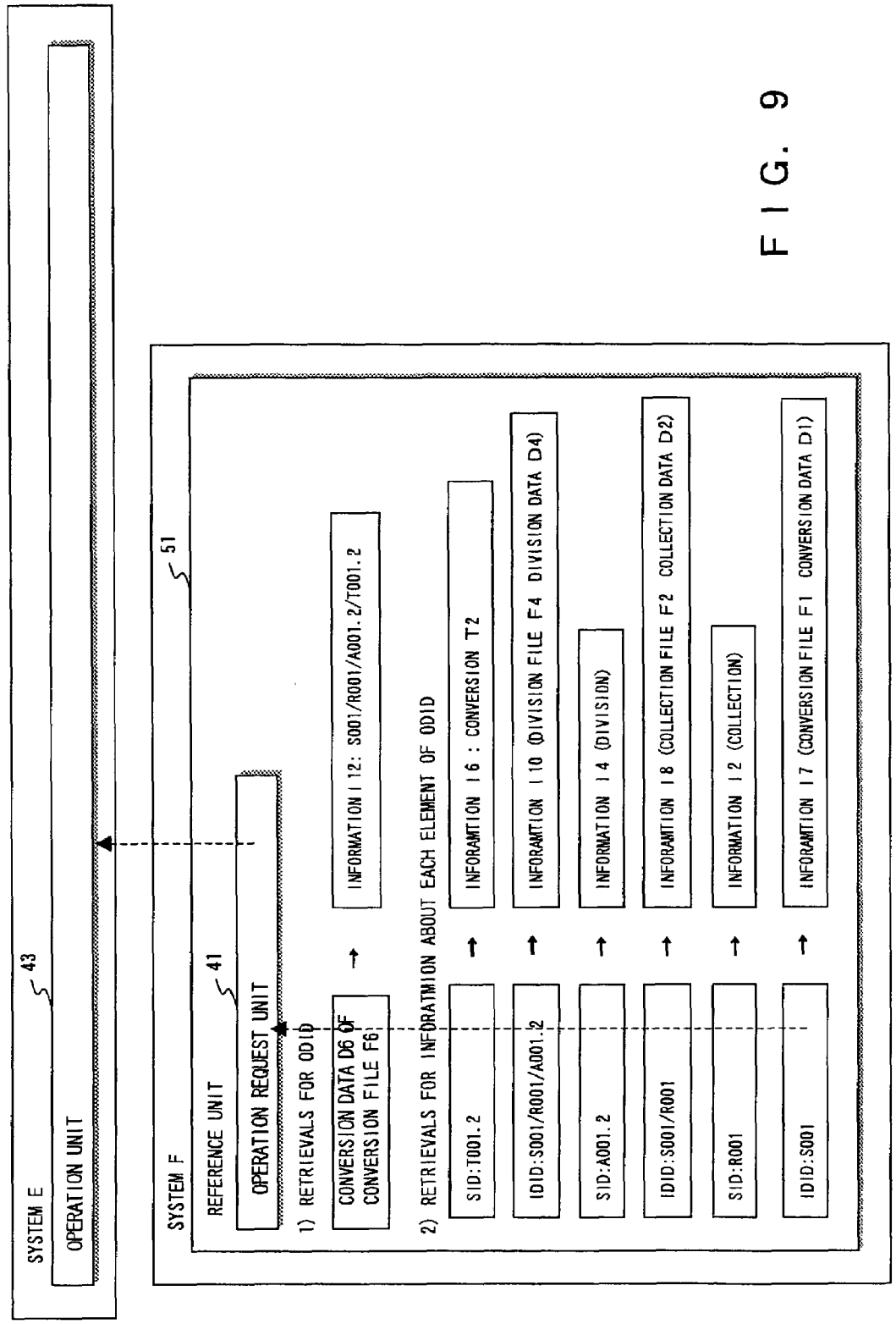
FIG. 9 shows the tracking process of a process history (No. 2).

FIGS. 8 and 9 show a process for tracking a history covering until specific data are stored in a file based on process information recorded in the storage medium 44 shown in FIG. 5. In this example, if the reference unit 51 of the system F tracks a history information until the conversion data D6 of conversion file F6 shown in FIG. 4 is stored, the reference unit 51 performs the process in the following procedure.

1) The reference unit 51 retrieves data from the storage medium 44 of system D via both the operation request unit 41 and the operation unit 43 of system E using the conversion data D6 of conversion file F6 as a key and obtains a corresponding ODID. In this example, the unit 51 obtains S001/R001/A001.2/T001.2 from process information I12 as an ODID.

2) The unit 51 analyzes the obtained ODID based on the assembly logic described above. In this way, it is found that this ODID is composed of the following constituent elements.

T001.2: SID of the last process
S001/R001/A001.2: IDID of the last process
A001.2: SID of a process before the last process
S001/R001: IDID of a process before the last process
R001: SID of a process before the preceding process before the last process (the first process)
S001: IDID of the first process Then, the unit 51 retrieves data from the storage medium 44 using each SID obtained by the analysis as a key and obtains the function name of a corresponding service from the basic process information including the SID. The unit 51 also retrieves data from the storage medium 44 using each IDID as a key and obtains a corresponding output content from the input/output history information with the IDID as an ODID. Then, the unit 51 regards the obtained output content as an input content corresponding to the IDID.

For example, if SID=T001.2 is used as a key, "conversion T2" is obtained from process information I6. If IDID=S001/R001/A001.2 is used as a key, "division data D4 of division file F4" is obtained from process information I10.

Then, a process history is assembled based on the obtained information. In this case, the following process history is generated in an order the reverse of the performance of a process.

S001/R001/A001.2/T001.2
Process information I12 (Conversion file F6, conversion data D6)
T001.2
Process information I6 (Conversion T2)
S001/R001/A001.2
Process information I10 (Division file F4, division data D4)
A001.2
Process information I4 (Division)
S001/R001
Process information I8 (Collection file F2, collection data D2)
R001
Process information I2 (Collection)
S001
Process information I7 (Conversion file F1, conversion data D1)

In this way, since a process history can be tracked by retrieving process information recorded from the storage medium 44, it is unnecessary to integrate history information into a data format or protocol electronic message. In the example described above, a history is tracked by tracking a process using specific data. However, conversely, if a process after specific data are stored is tracked, the same procedure applies.

The reference unit 51 can also perform a variety of information processing besides the tracking of a process history by searching for process information. Information processing using process information includes the followings.

(1) Collection of a communications logs
(2) Collection of charging information
(3) Collection of load information
(4) Confirmation of an operating state Of these, the collection of communications logs is a process for collecting communications logs based on the process information about a collection/transfer process. For example, if both the start time and end time of collection or transfer and the name of a system that performs a process are collected as a communications log, the reference unit 51 searches for basic process information using "collection"/"transfer" as a function name key. Then, the unit 51 obtains, for example, information shown in FIG. 10 as a communications log. The unit 51 can also make a reference of a transaction state using the collected communications logs.

The collection of charging information is a process for collecting information used to charge the user of the electronic data interchange system. For example, if a fee is charged based on the total process time relating to specific collection data, the reference unit 51 performs the process by the following procedure.

1) It searches for input/output history information using the information of collection data as a key and obtains a corresponding ODID.
2) It searches for basic process information using the obtained ODID as a key and obtains both a start time and an end time from process information with IDID or ODID, including the identifier.
3) It outputs the obtained information as charging information. It also calculates a process time by subtracting the start time of each process from the end time and calculates the total process time summing up each process time.

For example, if a fee is charged against collection data D2 based on the process information shown in FIG. 8, charging information, as shown in FIG. 11 is collected. In this case, since ODID corresponding to collection D2 is S001/R001, the time information of a rectangular area 91 is obtained from the basic process information with IDID or ODID, including this ODID as a constituent element. Then, a total process time is calculated based on these pieces of time information.

The reference unit 51 can also collect the size of specific data, the frequency of a specific process, etc., besides time information as charging information.

The collection of load information is a process for collecting information about the load of each system (process time, process frequency, data size, etc.). The confirmation of an operating state means to regularly monitor and to arrange process information, and it is a process for confirming a currently working process.

Figure 12:
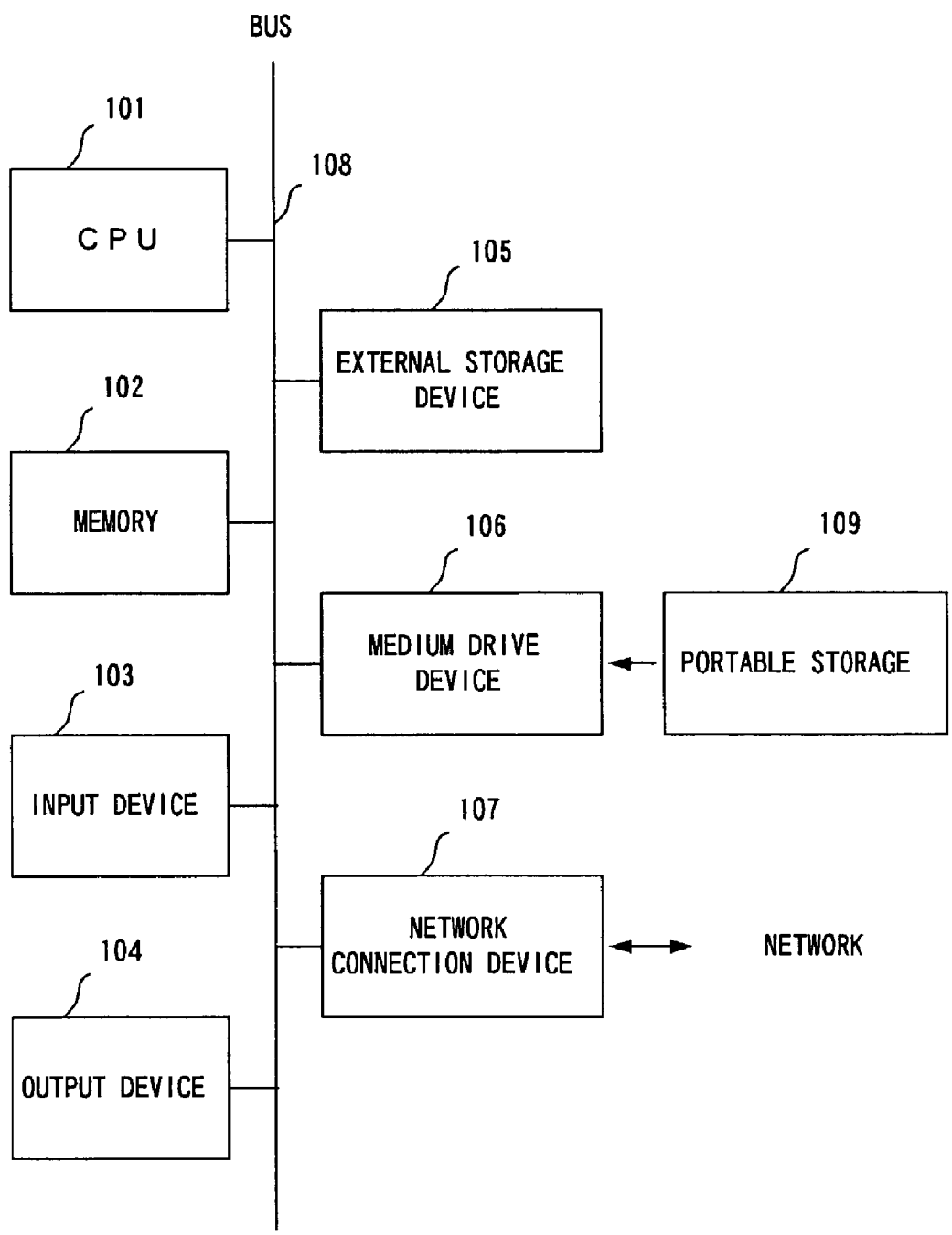
FIG. 12 shows the configuration of an information processing device.

Each system composing the electronic data interchange system described above can be configured using, for example, an information processing device (computer), as shown in FIG. 12. The information processing device shown in FIG. 12 comprises a CPU (central processing unit) 101, a memory 102, an input device 103, an output device 104, an external storage device 105, a medium drive device 106 and a network connection device 107, and the devices are connected to each other via a bus 108.

The memory 102 includes, for example, a ROM (read-only memory), a RAM (random-access memory), etc., and stores both a program and data used for the process. The CPU 101 performs necessary processes by using the memory 102 and executing the program. For example, each exchange process unit, operation request unit 41, operation unit 43, reference unit 51 and running unit 52 shown in FIGS. 2 and 3 are stored in the memory 102 as a program.

The input device 103 includes, for example, a keyboard, a pointing device, a touch panel, etc., and is used to input the user's input of instructions and information. The output device 104 includes, for example, a display, a printer, a speaker, etc., and is used to output inquiries and process results to a user.

The external storage device 105 includes, for example, a magnetic disk, an optical disk, a magneto-optical disk device, a tape device, etc. The information processing device stores in the external storage device 105 the program and data described above in advance, and uses both the program and data by loading them into the memory 102, if required. The external storage device 105 is also used as the storage medium 44 shown in FIG. 3.

The medium drive device 106 drives a portable storage medium 109 and accesses the recorded content. For the portable storage medium 109, an arbitrary computer-readable storage medium, such as a memory card, a floppy disk, a CD-ROM (compact-disk read-only memory), an optical disk, a magneto-optical disk, etc., are used. A user stores both the program and data described above in this portable storage medium 109 in advance and uses both the program and data by loading them into the memory 102, if required.

The network connection device 107 is connected to an arbitrary communications network, such as a LAN (local area network), etc., and transmits/receives data to/from another system. The information processing device also receives both the program and data described above from another device via the network connection device 107 and uses both the program and data by loading them into the memory 102, if required.

FIG. 13 shows examples of computer-readable storage media that can supply both a program and data with the information processing device shown in FIG. 12. Both the program and data stored in the portable storage medium 109 or the database 111 of a server 110 are loaded into the memory 102. In this case, the server 110 generates a carrier wave for carrying both the program and data and transmits both the program and data to the information processing device via an arbitrary transmission medium in the network. Then, the CPU 101 performs necessary processes by using the data and executing the program.

According to the present invention, if a process history is recorded and utilized in a data processing system composed of a plurality of systems, a general process can be performed regardless of the types of a data format, a communications protocol, process, etc.

What is claimed is:

1. A recording system, comprising:
a generation device generating process information indicating a content of a process in a specific system; and
a recording device recording the process information of the specific system generated by the generating device, the process information of the specific system recorded in a shared storage medium that is shared by a plurality of systems including the specific system and is commonly searched by the plurality of systems and that collectively stores a plurality of pieces of process information of the plurality of systems, in a format that a process information of the entire system comprising the plurality of systems is collectively managed by the shared storage medium and a process history of the plurality of systems can be tracked without requiring access to the specific system, each system of a plurality of systems comprising a processor, a memory, an external storage and a separate operating system.

2. A recording system, comprising:
a generation device generating process information indicating a content of a process in a specific system; and
a recording device recording the process information of the specific system generated by the generating device, the process information of the specific system recorded in a shared storage medium that is shared by a plurality of systems including the specific system and is commonly accessed by the plurality of systems and that collectively stores a plurality of pieces of process information of the plurality of systems, in a format that a process history of the plurality of systems can be tracked, each system of a plurality of systems comprising a processor, a memory, and an external storage, and the shared storage medium stores output identification information related to an output content of a preceding process before a current process in the specific system, said generation device generates service identification information of the current process, obtains the output identification information of the preceding process from the shared storage medium, generates input identification information related to an input content of the current process, generates output identification information related to an output content of the current process by concatenating the input identification information and the service identification information into the output identification information and generates the process information of the specific system by relating the service identification information, the input identification information, the output identification information and a content of the current process to each other.

3. The recording system according to claim 2, wherein when the input content of the current process includes a plurality of pieces of input data, said generation device generates input identification information related to each piece of input data, generates input group identification information for grouping a plurality of pieces of input identification information corresponding to the plurality of pieces of input data and attaches relationship between the plurality of pieces of input identification information and the input group identification information to the process information of the specific system.

4. A computer-readable storage medium on which is recorded a program for enabling a computer to execute operations, said operations comprising:
generating process information indicating a content of a process in a specific system; and recording the process information of the specific system in a shared storage medium that is shared by a plurality of systems including the specific system and is commonly searched by the plurality of systems and that collectively stores a plurality of pieces of process information of the plurality of systems, in a format that a process information of the entire system comprising the plurality of systems is collectively managed by the shared storage medium and a process history of the plurality of systems can be tracked without requiring access to the specific system, each system of a plurality of systems comprising a processor, a memory, an external storage and a separate operating system.

5. A recording system, comprising:

generation means for generating process information for indicating a content of a process in a specific system; and recording means for recording the process information of the specific system generated by the generating device, the process information of the specific system recorded in a shared storage medium that is shared by a plurality of systems including the specific system and is commonly searched by the plurality of systems and that collectively stores a plurality of pieces of process information of the plurality of systems, in a format that a process information of the entire system comprising the plurality of systems is collectively managed by the shared storage medium and a process history of the plurality of systems can be tracked without requiring access to the specific system, each system of a plurality of systems comprising a processor, a memory, an external storage and a separate operating system.

6. A recording method, comprising:

generating process information indicating a content of a process in a specific system; and recording the process information of the specific system in a shared storage medium that is shared by a plurality of systems including the specific system and is commonly searched by the plurality of systems and that collectively stores a plurality of pieces of process information of the plurality of systems, in a format that a process information of the entire system comprising the plurality of systems is collectively managed by the shared storage medium and a process history of the plurality of systems can be tracked without requiring access to the specific system, each system of a plurality of systems comprising a processor, a memory, an external storage and a separate operating system.

* * * * *